(12) United States Patent
Mehta et al.

(10) Patent No.: US 8,396,867 B2
(45) Date of Patent: Mar. 12, 2013

(54) IDENTIFYING AND RANKING NETWORKED BIOGRAPHIES AND REFERRAL PATHS CORRESPONDING TO SELECTED QUALIFICATIONS

(75) Inventors: Sunil Mehta, Fremont, CA (US); David Meyer, Spanish Fork, UT (US); Poonam Murgai, Fremont, CA (US)

(73) Assignee: NimbleCat, Inc., Fremont, CA (US)

( * ) Notice: Subject to any disclaimer, the term of this patent is extended or adjusted under 35 U.S.C. 154(b) by 28 days.

(21) Appl. No.: 13/182,438

(22) Filed: Jul. 13, 2011

(65) Prior Publication Data

US 2013/0018871 A1 Jan. 17, 2013

(51) Int. Cl.
*G06F 7/00* (2006.01)
*G06F 17/30* (2006.01)
(52) U.S. Cl. ............... 707/723; 707/736; 707/755
(58) Field of Classification Search .............. None
See application file for complete search history.

(56) References Cited

U.S. PATENT DOCUMENTS

| | | | |
|---|---|---|---|
| 6,385,620 B1 * | 5/2002 | Kurzius et al. ............... 1/1 |
| 7,818,396 B2 | 10/2010 | Dolin et al. |
| 2003/0187813 A1 | 10/2003 | Goldman et al. |
| 2004/0210661 A1 * | 10/2004 | Thompson ................ 709/228 |
| 2005/0159970 A1 | 7/2005 | Buyukkokten et al. |
| 2009/0063565 A1 * | 3/2009 | Abhyanker ............... 707/104.1 |
| 2010/0082695 A1 | 4/2010 | Hardt |
| 2010/0114789 A1 * | 5/2010 | Dane .......................... 705/321 |
| 2011/0035677 A1 | 2/2011 | Vitale et al. |

FOREIGN PATENT DOCUMENTS

WO WO2009007754 A1 1/2009

OTHER PUBLICATIONS

SAP Community Network, Social Network Analyzer Prototype with People Finder for iPhone, SAP Community Network website, Feb. 5, 2010, <http://www.sdn.sap.com/irj/boc/index?rid=/webcontent/uuid/c0368f42-6e06-2c10-a899-f991176be28b>.

* cited by examiner

*Primary Examiner* — Jay Morrison
(74) *Attorney, Agent, or Firm* — Proxigee Legal Transactions; Elizabeth A. Nevis, Esq.

(57) ABSTRACT

The most common automated search methods produce less-than-ideal results when searching online resumes, profiles, and the like ("biographies") for the identities of people with a searcher-selected qualification ("candidates"). Keywords, their proximities, and their repetitions are less informative in biographies than in other informational documents. Similarly, chains of social connection ("referral paths") do not always reveal the likelihood or ease of a searcher's introduction to a candidate. In both cases, the display order of results may be unrelated to any estimate of merit. To answer the question "Whom do I need and how do I reach them?" a classifier system uses heuristics or algorithms adapted to match the reactions of human experts on the selected qualifications. Terms in biographies, regardless of structure, are standardized and disambiguated for accurate comparisons, meaningful context is preserved, and biographies and referral paths are scored based on expected usefulness to the searcher.

19 Claims, 2 Drawing Sheets

IDENTIFYING AND RANKING NETWORKED BIOGRAPHIES AND REFERRAL PATHS CORRESPONDING TO SELECTED QUALIFICATIONS

RELATED APPLICATIONS none

FEDERALLY-SPONSORED RESEARCH & DEVELOPMENT none

APPENDICES none

BACKGROUND

Related fields include linguistic processing of semi-structured documents, mining of networked data, artificial intelligence, and probabilistic scoring. Industrial applications include, but are not limited to, professional networking, recruiting, demographic studies, and trend-spotting.

Finding known individuals has become vastly easier with the development of large-scale networks and efficient search engines. Increasingly, such networks are also used to find unknown individuals with specific desired qualifications (collectively, "candidates.") To do this, searchers gather and analyze documents describing specific people as having those qualifications, such as online resumes or profiles (collectively, "biographies.")

In most cases, candidates with a given expertise are sought by searchers who do not share it. A recruiter with a background in human resources works on behalf of hiring managers with numerous different backgrounds. A salesperson's target market is often not other salespeople. Someone considering a career change wants informational interviews with those already in the prospective new career. A student or junior professional seeks a mentor. A working team notices a need for a skill the present members lack.

Hiring, or being advised by, the wrong person can do significant harm. Studies show that the cost of hiring the wrong person is often equivalent to 6 months of that person's salary. In a position to influence business directions and use of resources, the wrong person may do irreversible damage.

Automated search engines for the Internet and smaller networks are optimized to find and rank bodies of information. Boolean search techniques, which link user-selected keywords or key-phrases with logical operators such as "and," "or," and "not," are highly effective for characterizing information. Improvements include automatically searching for different forms of the same word ("stemming"), learning synonymous terms, and bracketing quantities (e.g., "published between 1995 and 1998," "costing less than $30 USD"). These "semantic search" extensions reduce the incidence of a wanted result being excluded because the text has something similar but non-identical to the search term.

In U.S. Pat. No. 7,599,930, Burns & Rennison develop one approach tailored to evaluating resumes. They represent concepts by patterns and tokens, apply hash functions, and find matches in a lexicon or ontology often implemented for fast lookup in a hash table or a database. Potential pitfalls can occur if items in the resume are not in the underlying ontology (e.g., a period of employment with a small independent company) or if the ontology is not equipped to disambiguate similar names (e.g., if the collection of patterns that were being applied only had "University" within a few words of "Texas," then resumes citing "University of Texas at Austin" and "Texas A&M University" could not be separated by this method).

Boolean-based searches have also been used to identify individuals having selected qualifications or connections to other individuals, according to information available on the network. However, the volume of accessible information can be overwhelming and is constantly increasing. Besides, information about people (apart from filled-in forms with minimal opportunity for improvisation) is subject to contextual nuances that conventional search engines often do not detect. Consequently, the result list from such a search can be unmanageably large, swollen with erroneous returns.

For example, suppose a company wants to recruit someone experienced to maintain its internal computer network. The most common relevant job title is "system administrator," also sometimes "systems administrator." Others with less-common titles might still list "system(s) administration" among their duties. Putting those terms into a Boolean-based search engine for the entire Internet would probably return the online resumes or profiles of people suiting the company's needs. It would also return sites for schools that train systems administrators, news about careers in system administration, and every site that mentions its own system administrator or anyone else's. The number of returns could reach into the millions, but some of those wanted might still be missed because of semantic differences.

To limit the results to resumes and profiles of system administrators, one can either add 'and (resume or profile)' to the all-Internet search, or search inside a specialized database of resumes or profiles. Either way, more of the wanted returns are likely to be missed because of the additional constraint; the word "resume" or "profile" may not, per se, be in the document or the person may not be in the database(s) chosen. Also either way, the result list will still be very large and glutted with unwanted returns: managerial 'administrators' of school 'systems,' 'administrative' assistants at companies with names containing 'Systems'; perhaps even health workers trained on 'systems' for 'administration' of anesthesia.

Perhaps someone in the company happens to know that the computer-related type of system administrator will often use the abbreviation "sysadmin," while those other types generally do not. Adding 'and sysadmin' produces a more computer-oriented result list, smaller than the previous ones but still perhaps hundreds of returns long. The returns encompass sysadmins of many levels and subspecialties, including individuals with no relevant experience who list it as a future goal or include it in a keyword-list or metadata. The returns also include those who are not sysadmins themselves but manage, train, or offer products and services designed for them. In common experience, the best department manager is not necessarily the best at performing the actual work of the department, nor vice versa. Meanwhile, more wanted returns will almost certainly be excluded for lack of the abbreviation; many job-hunt advisors discourage use of such "insider language" in resumes and profiles.

Some result lists from Boolean-based search engines are ordered by the number of times the search terms appear in the document. This is a fairly helpful approach when searching for reference materials, but not for candidate resumes or profiles. Consider that "sysadmin" would appear 5 times in a resume describing relevant work for 5 different employers for less than a year apiece, but it would only appear once in a resume describing 10 years' work for a single employer. Alternatively, the result list may be in chronological order with the newest first; they may be ranked by how many times the document has been viewed (no matter by whom); the result order may be alphabetical by name or completely random; or originators may be able to jump to the top of the list by paying a premium. Other search engines, to hamper aspiring list-jumpers, do not fully disclose how their result lists are organized. None of these ordering methods are viable proxies for how well a resume or profile fits a set of desired characteristics, so a significant part of the list may need to be perused before even the first promising candidate emerges.

By contrast, a human very familiar with both the relevant field and the searcher's needs can often select or reject a candidate resume or profile within seconds of quickly skimming the biography. For several reasons, though, this is seldom a practical solution. Such an individual may not be available within the often-urgent timeframe. If available, they require payment that matches their considerable expertise. At a rate of 1 minute per evaluation, a result-list of 3000 resumes or profiles would require 50 expert-hours to sort.

Some human recruiters can reportedly sift 500 resumes per day, but at that pace thoughtfulness is likely to be compromised. A human quickly scanning for terms that "jump out" is arguably performing a machinelike keyword search, which as discussed above has yielded suboptimal results and invited biography writers to attempt to fool the system. Additionally, humans attempting to process information too quickly are subject to error sources to which machines are immune. A human brain immediately reacts to whether the esthetic aspects of a document match its subjective preferences, and only then begins to absorb the document's content. When a human skims through biographies too rapidly, both positive and negative decisions can easily be contaminated by subjective esthetics. Moreover, a human's rapid-processing acuity is sensitive to brain oxygenation, blood sugar, emotional state, and other factors that change over the course of a day. Because biographies in the result list of a conventional search engine are not necessarily in any more useful order than paper resumes that arrive chronologically in the mail, the search engine does not mitigate the need to analyze many, many biographies in what is likely to be insufficient time for high-quality thought.

Therefore, a need exists for someone from one field to be able to reliably identify those candidates from another field who are best suited for a particular set of requirements, and do so quickly and cost-effectively even when the initial pool of candidates is very large.

Identifying promising candidates, while a challenge in itself, is only the first step in most of these processes. The next step is usually to contact those candidates and pique their interest. Unless the candidate craves new contacts or the searcher credibly offers something the candidate already wants, approaching the candidate as a complete stranger is likely to fail. Referral by a mutual acquaintance can help immensely.

Online social networking sites have made it possible to determine quickly whether a searcher and a candidate have mutual acquaintances, and if so, who they are. When Searcher queries a social-networking application about a particular named Candidate, a resulting "referral path" (if any are found) is of the form "Searcher knows A, A knows B, and B knows Candidate." Most of these applications can only find a referral path if every person represented by a node on the path has entered a biography in the same network and has affirmatively acknowledged ("published") a connection to the nearest neighbors on the path. Thus, even in very widely used social networks, a single missing link can, sometimes inadvertently, block many connection opportunities. In U.S. Pat. No. 7,818,396, Dolin et al. enable a member of a first social network to retrieve profile and connection data from additional social networks into an aggregate social graph. This method, however, only provides additional data about people who are already members of the first social network.

Therefore, a need exists for effective synthesis of information about people's qualifications and connections from multiple sources with disparate information structures.

At the other end of the spectrum, those "power users" of existing social networks with hundreds or thousands of connections may find themselves with multiple referral paths to a new person they decide to contact. The user must then either take a scattershot approach with many paths, or research all the intermediate links to determine the most promising path.

Typical networks, if they rank alternate referral paths at all, do so only by the number of degrees of separation. For example, in U.S. Pat. App. Pub. 2003/0187813, Goldman & Murphy link data from multiple databases through a central database, calculate the shortest referral paths between pairs of users, and score longer paths by likelihood of closeness. Since each link may represent a single meeting or years of association, and may be social, professional, or both, ranking by degrees of separation does not necessarily identify the best referral path.

Some refinements, such as Hardt's in US2010/0082695, estimate closeness of connection by, for example, the number of times a pair of people have communicated. This is only practical in a microcosm, such as an enterprise where employees consent to have their electronic communications logged. Pitfalls exist, such as a tendency to talk to one's closest colleagues in person (which would not be logged by the system), and the multiplicity of communication generated by non-close interactions such as confusion over details in a seldom-used procedure. Therefore, a need exists for rapid comparison of multiple referral paths and recommendation ranking of those paths based on meaningful variables.

To summarize: Most of the Boolean and other keyword-based search engines are sub-optimal for finding candidates through a keyword search on desired characteristics. Biographies are structurally, semantically, and idiomatically different from documents containing other types of information. Meanwhile, most social-network advancements have concentrated on locating individuals with known identities rather than identifying individuals with desired characteristics. Large networks of resumes, profiles, and other biographies would be leveraged much more efficiently to find and reach candidates if the speed of automated search were combined with the nuanced judgment of a human—specifically, a human very familiar with biographies of the type of candidate sought. After identifying a human-manageable number of candidates with the requested qualifications, the system would continue to an automated survey of any referral paths between the searcher and each candidate. If multiple referral paths are found, the system would choose the path most likely to yield a prompt, well-received introduction of the searcher to the candidate. This choice is necessarily based on at least some of the criteria a human would consider important.

SUMMARY

A linguistic-analysis system uses nuanced full-string and contextual references to distinguish biographies (including, without limitation, resumes and social-network profiles) from those containing other types of information. A qualification-classifier function within the system determines a candidate's profession or industry based on an analysis of all the relevant information in the biography.

Human experts on each of the included professions or industries have tailored and tested (collectively, "informed") the qualification-classifier's component algorithms and heuristics to evaluate the biographical documents as they would themselves. The informed qualification-classifier can evaluate the extent and quality of a candidate's experience, and whether the experience is as an individual contributor or a manager. Thus, any searcher using the informed system profits from multiple experts' familiarity with the specific field, and from the higher speed and lower cost associated with automated search.

The informed qualification-classifier quantifies the results on a common scale using probabilistic scoring. The candidate scores may be normalized to a convenient scale, such as percentile ranks showing how a given biography compares to similar ones analyzed previously. The search-result list may then be displayed in an order based on the candidate score.

Supplementary information on common external professional-status metrics, such as a candidate's total years of experience or school rank, or whether a candidate's employer is in the Fortune 500, is sometimes desirable. The system can extract this type of information even from semi-structured or unstructured biographies. In some embodiments, these results can also become part of a combined probabilistic candidate score by which the search results are ordered.

The system can seamlessly interface with the searcher's social networking application. This enables the searcher to classify members of his network by profession, work history, education, and professional or managerial experience. Further, the system can search for people in the searcher's social network who are connected to the candidates in the result list, or people who may be connected because they attended the same school or worked in the same plant at the same time as the candidates. Finally, the system can present the candidates' relevant scores and referral paths in a graphic form that makes the alternatives easy to compare.

DETAILED DESCRIPTION

The processes and functions described herein may be performed on a suitable computing system capable of executing algorithms and heuristics and accessing biographies and connection data. The instructions may reside on a server, a client, or a combination of both. Some embodiments make partial use of mobile devices such as "smart-phones" or tablet computers.

Functions Performed

Figure 1A:
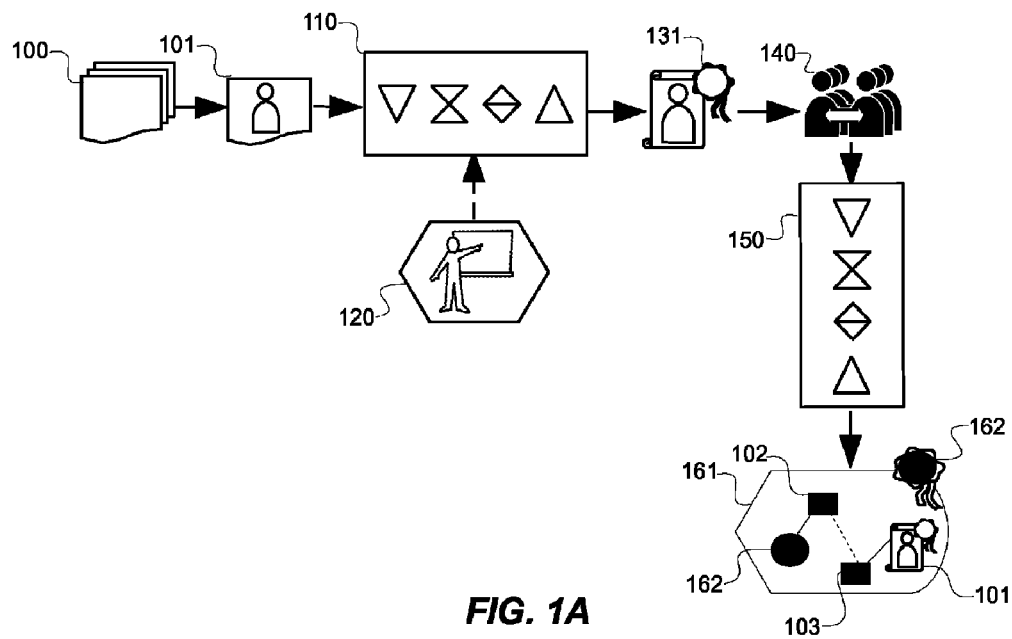
FIG. 1A is a general overview of an approach to automated search based on professional qualifications.

FIG. 1A is a general overview of one approach to automated search based on professional qualifications. A candidate biography 101 is selected from a collection of information sources 100. The selection process may be as simple as restricting the search to sites specializing in biographies, or as complex as searching a wide range of sites and identifying documents or subdocuments that exhibit biographical features. Biography 101 is then analyzed by qualification-classifier function 110. The qualification-classifier's analysis may involve (as shown by the interior symbols) merging data from multiple sources, standardizing terms in the biography, sorting the biography or parts of it into one or more categories, and extracting terms and context relevant to the qualifications being sought. Qualification-Classifier 110 was previously informed by human experts on various professions in a preparation step 120. The biography emerges with at least one candidate score 131 reflecting status in a career category. Multiple sources of connection data (e.g. social networks) 140 are sifted by connection-classifier 150 for connections to the candidate described in biography 101 ("candidate 101").

When a searcher 162 does a qualification-based search and the results include biography 101, connection-classifier 150 derives and displays referral paths such as 161. In the example, referral path 161 shows that searcher 162 can meet candidate 101 through intermediaries 102 and 103. If there is no referral path composed of published connections (especially likely if a searcher and candidate do not subscribe to the same social networking site), the system can extrapolate possible connections to complete the path. Here, the solid line between searcher 162 and intermediary 102, and that between intermediary 103 and candidate 101, represent published connections between those pairs of people—for example, they "friended" each other on a social network. The dotted line between intermediaries 102 and 103 indicates that although they have not published a connection, they may know each other nevertheless, because their biographies have something in common.

Optionally, the system may also evaluate the likelihood of this potential connection. For instance, if intermediaries 102 and 103 were football teammates for a year, they almost certainly know each other. By contrast, if the connection is a shared home-town, the probability of acquaintance depends on circumstances including the size of the town and the overlap between the dates of residence.

Another useful option is to analyze the relevance of a connection to the subject of the search. For instance, if candidate 101 emerges from a search for opera singers, a connection through a voice coach is likely to be more helpful than a connection through a former football teammate.

Figure 1B:
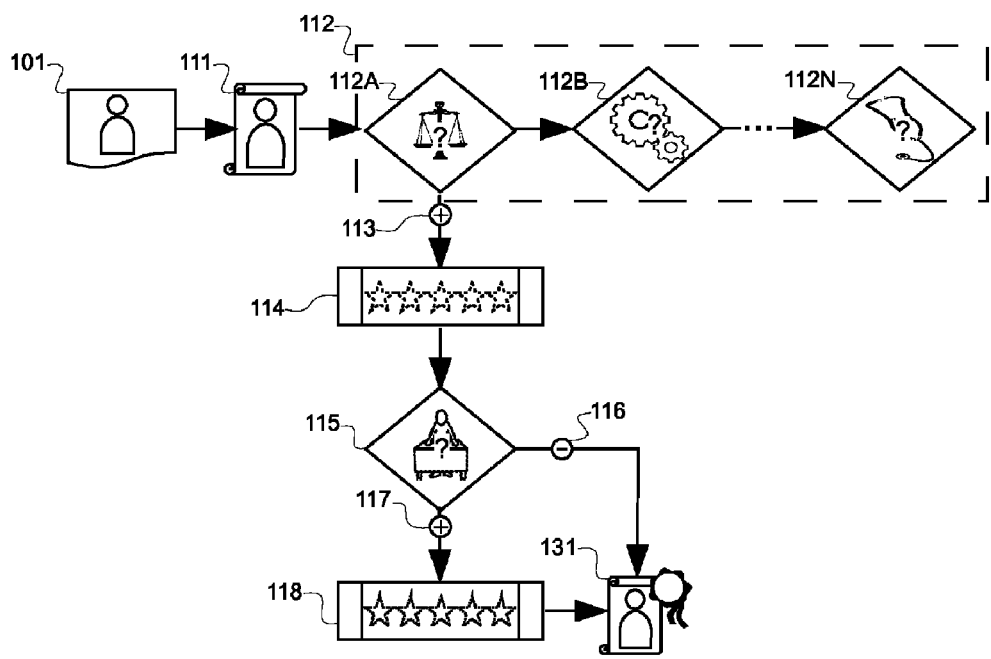
FIG. 1B shows components of a qualification-classifier function.

FIG. 1B is a schematic expansion of an example qualification-classifier function. Identified biography 101, whose structure or lack of structure is arbitrary, is reduced to a more convenient form for machine analysis and comparison, distilled expression 111. The distilled expression 111 is evaluated by a qualification-category filter 112 to determine the candidate's profession(s). Here, field filter 112 has N sub-filters 112A ("legal"), 112B ("engineering"), and so on out to 112N ("medical"). Some filters may use broad categories (e.g. "chemistry teachers" and "research chemists"). Others may use narrow categories ("organic chemists," "biochemists," "petroleum chemists," etc.). Still others may classify by industry (e.g., "pharmaceutical, semiconductor, agriculture . . . "), either besides or instead of profession.

When a qualification-category filter finds a positive match 113 in distilled expression 111, the matching parts are analyzed by a professional-scoring function 114 that rates the candidate as an individual contributor in that field. Here, external proxy metrics such as years of work experience and ranking of the candidate's school or company may optionally be factored in. In some embodiments, the matching parts are submitted to a management filter 115, which determines whether the candidate has managerial experience in that field. In this example, the candidate described in biography 101 has legal experience, shown by the positive response 113 to legal field sub-filter 112A. Management filter 115 looks for signs that the candidate has managed a law firm, legal department, or similar. If management filter 115 produces a negative response 116, scored biography 131 only has a legal professional score based on individual-contribution experience. If management filter 115 produces a positive response 117, a managerial-scoring function 118 adds a legal-managerial score to scored biography 131.

Preferably, processing by field filter 112 (or an equivalent sorting operation for industry or other qualifications) is not cut short when one sub-filter finds a match, but continues through all the sub-filters in case there is more than one match. For example, suppose the candidate of biography 101 is a non-managerial environmental lawyer with three years' experience. Knowing only that, a wilderness-conservation nonprofit would probably not consider him for its Board of Directors. However, if the classifier also highlights that he had previously worked as a park ranger for 15 years, he is revealed as a much more likely asset to the Board.

Collecting and Distilling Biographies

Computational speed and machine memory capacity increase constantly, but so does the volume of information that is both available and relevant. For example, a geologist wanting to consult with a paleontologist about a deposit of rock that may contain fossils is no longer restricted by practical considerations to candidate paleontologists who are located nearby or even necessarily those who speak his language; advances in communication technology greatly enlarge the candidate pool. At this writing, tradeoffs are common between the accuracy conferred by analyzing complete documents for contextual meanings and the efficient use of storage, processing power, and communication bandwidth. This tradeoff requires careful design decisions on how much, and what kind of, information may be stripped out of the biographies in the name of speed and compactness before the quality of analysis is unacceptably compromised.

Any suitable means of information aggregation may be used, as long as it is equipped to distinguish biographies from non-biographies and can permissibly access biography collections. At present, some document collections deliberately exclude automated access by "spiders," "scrapers," "bots," and other data-mining programs in general, but may admit particular ones under some conditions such as purchase of a license, use during off-peak hours, or accessing fewer than a threshold number of documents per second.

Each aggregated biography, connection set, or combination document is reduced to a mathematical "distilled expression" for compact storage and fast, accurate comparison with similar documents. The distilled expressions contain multiple independent or dependent variables and are preferably easy to store, retrieve, compare, and manipulate on the computational platform in use. For example, the distilled expressions may be tensors or other arrays in which at least some coefficients represent terms in the document reactive to at least one of the profession or industry filters (e.g., 112A-N in FIG. 1B). A term can be the surface form of an alphanumeric string, a diagram or trigram of proximate strings, or a characteristic of the string (e.g. part of speech, grammatical form, number of syllables). The latter characteristics are sometimes known in the art as "word metadata" (or simply "metadata" in the generic sense, but they differ from metadata specific to electronic documents, such as address headers on e-mails). Some embodiments of array-based distilled expressions assign meaning to both the magnitudes and the positions of coefficients in the array. This allows more arrays to be stored in a small space without omitting information.

Figure 2:
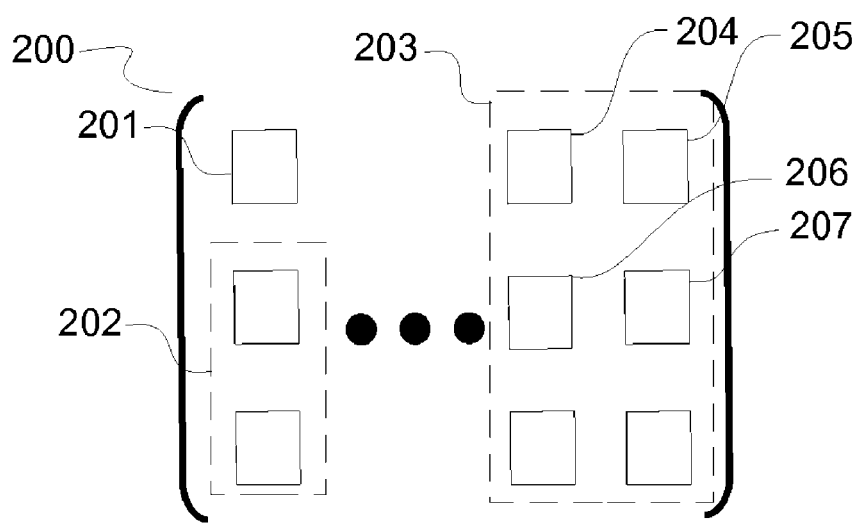
FIG. 2 is a schematic representation of a simplified tensor-type distilled expression.

FIG. 2 schematically represents an example of a distilled expression. In simplified rank-2 tensor 200, terms are conveyed by the coefficient values and their context by the coefficient position. This option is advantageously compact because the coefficients filled into the positions need only express the specific information rather than its context. For instance, block 201 can be reserved for a source locator. Pair of blocks 202 may store the candidate name and residence information. Pair of columns 203 can hold information on work history, with a row dedicated to each job and arranged in reverse chronological order. For instance, block 204 can hold the company name of the candidate's present or most recent employer, and block 205 can hold the duration of the candidate's employment with the block-204 company. Blocks 206 and 207 can hold the immediately previous employer and the candidate's length of employment there, respectively, and so on down the column.

Any convenient type of distilled expression may be used, including higher-rank tensors or vectors (which are rank-1 tensors). Some embodiments may use expressions suitable for independent-feature models such as naive-Bayes classifiers. Expressions suitable for random-forest, boosted-tree, and similar classifiers may alternatively be used.

Between (or sometimes within) terms in the original document will be (1) context that may be important for interpreting the terms, and (2) filler to accommodate human readers: white space, formatting, punctuation, incidental leading and trailing material, and common "stop words" that do not affect the meaning of terms. Filler may be omitted from the distilled expression without affecting accuracy. For example, a biographical news article may read:

"After receiving her MBA from State Poly, Jane Doe worked in acquisitions at BigCo until being elected mayor of Anytown last year."

In preparing the distilled expression, embodiments of the system begin by recognizing the identification and qualification data: "MBA," "State Poly," "Jane Doe," "acquisitions," "BigCo," "mayor," "Anytown."

Context, on the other hand, must generally be preserved or made reconstructible. In addition, some "document metadata" may need to be preserved or made retraceable. For example, if the distilled expression includes the source information for the document, the system can return periodically or ad-hoc to check for revisions. If the distilled expression also includes the date of last access, the system can optionally skip the step of checking for an update if the last access was very recent. Many "autobiographies" (biographies composed and posted by the person they describe) are subject to repeated updates. Moreover, if a document was posted by completing a fillable form, field names in the form can be relevant document metadata. Less-structured documents such as resumes may nonetheless have pseudo-fields or quasi-fields defined by headings such as "Education" or "Work Experience."

In substantially unstructured documents such as the example news article above, phrase and sentence structure provide clues through word-metadata. "MBA" is probably in the system's lookup table as a common academic degree. However, the system's recognition of the nearby preceding "received," and the following "from" linking it to something that looks like (or may also be stored as) a school name, "State Polytechnic," confirms that it does mean a Master of Business Administration degree and not, for example, an affiliation with Mortgage Bankers' Association, a job in molecular biological analysis, or the tail end of a word such as "marimba." Word-metadata for "Jane Doe" includes its position as the subject of the sentence and its form as two adjacent capitalized words, signaling that it may be a proper name. The positions of the subordinating conjunctions "after" and "until" provide the order of the degree and the two jobs. Finally, the document-metadatum that the article was published in 2011 clarifies the otherwise ambiguous term "last year." Using this context, the system may tag and order the qualification data, for example:

name=Doe,Jane
    job=mayor-'Anytown'-2010__2011
    job=acquisitions-'BigCo'-??__2010
    edu=MBA-'State_Poly'-??

(Equivalents expressed in alternate source or object codes are within the scope of protection.) The symbol "??" represents a placeholder for unknown data. In the example, the news article did not supply the date of Jane's degree or her starting date at BigCo. Such gaps are common even in completed fillable forms. Preferably, the system copes by using placeholders or the like. The placeholders may be filled by data from another document, such as Jane's profile on a social network, or not. Incomplete information can still be useful. For example, an Any County citizens' coalition against BigCo's plan to dam the Any River would want to know that Anytown's mayor, Jane Doe, worked for BigCo as recently as 2010—but exactly when that employment began might not matter.

To achieve the goals of comparing and scoring biographies and inferring unpublished connections, terms whose form varies from document to document need to be standardized in the corresponding distilled expressions. In the Jane Doe example, "State Poly" turns out to be a local nickname for the Exemplary State Polytechnic University. The school is also known, especially outside the state of Exemplary, as Ex-S-Poly, ExPU, and ESP (which last must be context-disambiguated from "extra-sensory perception" and ESP Guitars™). Likewise, BigCo refers to the business entity known variously as Big Company, Big Company, Inc., BigCo-USA, and stock ticker "BC." Even Jane Doe may also be written of as "Janie Doe" or "J.J. Doe," or as "Jane Doe-Public" upon her marriage to John Q. Public. The system uses any or all of look-up tables, heuristics, and inferential algorithms to assign a unique consistent value in the distilled expression to a given person, school, company, or other organization.

As well as words, the system preferably standardizes quantities. The same quantity can be expressed in a number of different ways, but the system needs to know that they are the same. For example, on a traditional resume or curriculum vitae ("CV") durations are usually expressed by their endpoints: "BigCo, Inc., Acquisitions Manager, 2003-2010." Finable forms such as social-network profiles or applications for employment, however, may require that durations be expressed by their length (possibly combined with a start or end date): "Employer Name [BigCo, Inc.] Position Held [Acquisitions Manager] for (years) [7] (months) [11]." The process for reducing documents to distilled expressions is preferably flexible enough to recognize and store these two dissimilarly-expressed durations as the substantially equivalent values they represent. Another preferred feature is the ability to gloss over common imprecisions and omissions (such as the nearest-year roundoff in the above resume or the lack of any endpoint date in the above fillable form) without causing a malfunction. In enhanced embodiments, if an important quantity is missing, the system may attempt to piece together other available biographical information to bracket a probable range for that quantity.

Human-Expert Tailoring of Classifiers

One of the major challenges in evaluating professional biographies is that each profession has its own jargon. The same term may mean different things in different industries. Terms that are colloquially synonymous may take on markedly divergent meanings in the context of specialized jargon. In some cases, a single jargon term might have multiple meanings within an industry. This presents a dilemma for those writing resumes and profiles as well. A peer, hiring manager, or potential client will probably look for correct usage of specialized language as an index of credibility. By contrast, a screener in a human-resources department, a speakers'-bureau coordinator, or a student looking for career advice may reject even an ideal candidate because that same specialized language is often highly opaque to lay readers.

An artificial-intelligence system is trainable; its ability to "learn" sets it apart from other types of machine-based analysis. As with living creatures, the trained entity's performance quality hinges at least partially on the skill of the trainer. A preferable approach to the refinement of classification and scoring algorithms for professional biographies, then, is to have the system trained by experts in the relevant fields who can distinguish a credible experiential narrative from a mere salting of buzzwords.

For each qualification category to be classified by the system, the following process is followed before bringing the system online, and periodically afterward to adapt to changes in the field or its expressions:

Collect a large number of biographies of people at various levels in the category ("reference set"). These may be actual, synthesized, or a mixture of both.

Have one or more experts on the category "hand-score" the biographies in the reference set. In some embodiments, managerial experience is scored in addition to individual-contributor expertise. The experts explain in detail the rationales and weighting of the various features of the biographies that led them to assign the respective scores.

Choose a process of reducing biographies to distilled expressions that will preserve the types of information the experts identify as important.

Derive a classifier process (algorithmic, heuristic, or both) that determines the degree of matching between a subset of the reference set and the distilled expression of a test biography.

Run the classifier on the reference set and compare the resulting scores with the experts' hand scores. If necessary, refine the reference set until the derived heuristic repeatedly produces scores matching the experts' hand scores within an acceptable margin.

Store the distilled expressions of the reference set for use by the classifier in running and refining future heuristics.

Pull additional real biographies from public or private sources and have them machine-scored and hand-scored. Compare the scores and refine the reference set until the scores consistently match within an acceptable margin.

In some embodiments, if a biography reveals more than one profession, it may be routed through as many filters as there are professions described in the biography. The rapidly changing global economy has prompted professionals to constantly adapt to emerging niches when traditional ones disappear.

When a statistically significant number of biographies have been scored for each profession, a suitable probability distribution can be fit to the results. Examples include a Cauchy distribution and a Gaussian "bell curve." Distribution-fitting allows scores to be normalized for quick comprehension by readers. For instance, a score of 0 to 100 representing an approximate percentile rank is familiar to anyone who has had to understand standardized examination results. Once normalized, the same scores likely represent equivalent standings in different professions. For instance, a senior biologist and a senior physicist at a major national laboratory would probably both have normalized scores in the upper 90s, even though each one's biography was processed through a different filter before normalization.

In some embodiments, additional external metrics commonly used as proxies for professional expertise may be factored into the score. Some typical proxy factors are number of years of work experience, highest degree attained, and the ratings, as calculated by public or private independent panels, of the schools (or specific departments within those schools) attended by the candidate. Number of publications authored and number of mentions in other authors' publications are popular proxies in some fields. In others, visits or links to the candidate's website, customer reviews, or recommendations from professional societies of peers or clients can be persuasive proxy quantities to include in. The resulting aggregate score can also be normalized.

Some embodiments allow searchers to select which proxy quantities to include or exclude. This can be very useful in meeting the searcher's (or the searcher's client's) particular needs. For instance, suppose two news shows decide to search for additional investigative reporters. One show aspires to be the most trusted, and may want the search to give considerable weight to citation of the candidate's work in reputable publications and recognition by respected awards committees. The other show aspires to be the most popular, and may want the search to emphasize recent readership or listenership, mentions of the candidate in gossip columns, and demand for interviews or other appearances. One important object of this system is to comb through all the possibilities and return a manageable number of "good" ones. The ability to tailor the filters to what "good" means in different contexts can be highly beneficial to searchers who are sensitive to those distinctions.

Handling of Searchers' Queries

Some embodiments create an archive of datasets representing biographies that the system has already categorized and scored. At a minimum, each dataset includes an identifier of the corresponding candidate, the candidate's qualification category(ies), and the candidate's qualification score(s). Other embodiments may store larger datasets that include more information, or complete distilled expressions, or copies of the original biographies. Still other embodiments—for example, those drawing information from databases that are all regularly indexed by a common document-management protocol—may be able to quickly scan the database indices without the need for a separate archive.

Integration of Social Connection Data

When a candidate is identified with a biography matching a searcher's input criteria, the system will propose at least one referral path that the searcher may use to reach the candidate. This system does not rely solely on number of degrees of separation, nor is it limited to connections the searcher, candidate and intermediaries have published.

A searcher using this system may belong to more than one social network. Therefore, in some embodiments, the system can combine the searcher's connection data from multiple networks into a single extended network on which to carry out these operations.

For each biography connected to the searcher in a social network (extended or otherwise), the system standardizes the names of schools, companies, hobbies, interests and other attributes of the biography and computes a normalized professional score, just as with candidates. The system discovers intermediaries between the searcher and the candidate:

who have published connections to each other, or whose work histories, education, hobbies, interests or other attributes of the biography overlap the candidate's, or whose biographical attributes overlap those of the neighboring members of the referral path.

Note that one or more gaps in the referral path, where published connections are lacking (and may not even be on the same social network) can be bridged by possible connections identified by overlapping biographical attributes. Where two or more alternate referral paths emerge, the system scores them, not just by total length of the referral path but by certainty of the links. Certainty metrics can include how many possible connections compared to published connections, and how likely the possible connections are. Likelihood of the possible connections can be based on the duration of the overlap, how long ago it ended, the size of the organization where the overlap occurs, and any available detail about where within the organization the respective parties spent their time.

For example: The system discovers that Pat and Chris went to the same university and their stays overlapped by one year. A baseline likelihood score is assigned from the probability that one college student will meet another in a school of average size. If the system has learned that this university had 40,000 students that year, it adjusts the likelihood score downward according to a statistical formula. If no other overlap is detected and this one was 15 years ago, the likelihood score is adjusted downward again; although this does not make their meeting during that year any more or less probable, a longer time since the overlap reduces the probability that they still remember each other even if they did meet. However, if Pat's and Chris's biographies reveal that during the overlap year they were both graduate students writing theses on Cherokee literature, the likelihood score is adjusted upward because having something uncommon in common increases the odds that they met. The final likelihood score reflects as many of these correction factors as the biographies provide and the system is equipped to glean.

Where two or more referral paths are discovered between the searcher and a given candidate, the referral paths can be ranked by a variety of criteria or combinations of criteria. Number of links is a common criterion, based on assuming that a referral path with fewer links will yield an introduction faster. Geographic proximity can also affect how frequently two linked individuals communicate. When link strength is scored, referral paths may be ranked by the average link strength over the whole path, or by the strength of the weakest link where communication is most likely to falter. Where the biographies of the intermediaries have been given professional-qualification scores, those scores may also be used to rank the referral path, based on the assumption that a referral from someone of stature in a profession is often more likely to be accepted promptly than a referral from a junior or outsider.

Display and Ordering of Results

Ideally, the display of results should be quickly and easily understandable to the searcher, and the order or other distribution of emphasis should draw the searcher's eye first to the paths of least resistance to the most promising candidates.

Graphics are easily comprehensible by many readers. Numerous programs have been developed for visualization of networks. Although these tend to concentrate on showing vast multitudes of nodes and connections for an overview of the accreted macrostructure of the network, similar approaches may be readily adaptable to displaying smaller networks, perhaps in more detail. By contrast, some highly verbal individuals absorb information more easily from an ordered list than from a graph.

Candidates can also be ranked by their best referral-path score, which can represent the degree of ease or difficulty the searcher can expect in trying to reach the candidate. The number of connections in a referral path is a partial indicator, but the closeness of the connections is also informative and can be estimate by the duration and number of the overlaps between the biographies of neighbors on the path. The connectivity score can be transformed onto a convenient scale by a mathematical function, e.g., a logarithm.

A searcher looking for candidates by qualification has two fundamental questions: (1) Who are the most potentially useful candidates for the opportunity at hand, and (2) How can I reach those candidates? As mentioned before, some embodiments allow tailoring of the external metrics considered when choosing candidates in response to question (1). Some embodiments also allow tailoring of the criteria for ranking and ordering the paths responsive to question (2). For example, the searcher may be enabled to adjust the relative weighting of the professional score and the connectivity score (and perhaps other factors such as geographical proximity). Tailoring the results in this way can save the searcher additional time.

Contrast these two scenarios: A speakers' bureau coordinator may prefer to book someone famous. The need to deal with hectic schedules and multiple gatekeepers to reach such a candidate is expected and consciously traded off for the larger audience a "star" speaker will draw. This searcher would weigh professional score more heavily than connectivity score. On the other hand, a student seeking a mentor already practicing his prospective profession may place a higher value on ease of access, once a certain threshold of professional capability is met. That searcher might impose a cutoff for professional scores below the threshold, but beyond that would weigh connectivity score more heavily than professional score and may also want local candidates on top of the list.

CONCLUSION

Embodiments of the system described here reduce the human labor involved in prior automated searches for unknown candidates with desired qualifications. Reference sets, heuristics, and distilled-expression forms are initially informed and refined by human experts familiar with the specialized biographies of professionals in various fields. This enables a machine search to approach the quality of a skilled human review of the biographies in a fraction of the time. Normalized scores estimate each candidate's standing in the field being searched. Biographies reflecting changes of field during a candidate's career, which are becoming increasingly common, are readily handled by the system. Combining the identification of suitable candidates with collected social-network and other connectivity data immediately shows the searcher how to reach the candidate and how much time and effort it may take. Finally, collecting data on searches being done, even without examining or disclosing the searchers' identities, can be valuable to those studying socioeconomic trends. The types of people being searched for may correspond to the health of the industries using those people's skills.

Only the appended claims, rather than this description and its accompanying drawings, shall limit the scope of protection of the issued patent.

We claim:

1. A method of identifying a candidate with a selected qualification and deriving a referral path from a searcher to the candidate, the method comprising:

retrieving a biography from networked storage,
reducing the biography to a distilled expression comprising reference terms, qualification-related terms, and meaningful context,
classifying the biography by comparing the distilled expression to a reference set of expressions distilled from human-scored reference biographies,
assigning a qualification category and a qualification score to the biography responsive to a match of the distilled expression to a subset of the reference set,
storing a dataset comprising the qualification category, the qualification score, and an identifier of the biography in an archive,
enabling a searcher to select a qualification and search the archive for a candidate with the qualification,
extracting published connections between the searcher, the candidate, and any mutually connected intermediary from the networked storage,
detecting possible unpublished connections as overlaps in the biographies of the searcher, the candidate, and the intermediary,
deriving a referral path from the searcher to the candidate from the published or the possible unpublished connections, and
calculating a connectivity score for the referral path reflecting likelihood and ease of an introduction of the searcher to the candidate through the intermediary.

2. The method of claim 1, where the networked storage comprises a plurality of dissimilarly constructed databases.

3. The method of claim 1, where the distilled expression is made substantially independent of an original structure of the biography by standardizing variably-expressed terms having identical meanings.

4. The method of claim 1, where the distilled expression comprises an array of coefficients.

5. The method of claim 4, where the array comprises a tensor.

6. The method of claim 5, where the tensor is a first-rank tensor.

7. The method of claim 4, where a position of a coefficient in the array conveys a separate meaning from a value of the coefficient.

8. The method of claim 1, where the comparing of the distilled expression to the reference set comprises calculating a correlation coefficient.

9. The method of claim 1, where the comparing of the distilled expression to the reference set comprises calculating a root-mean-square difference.

10. The method of claim 1, where the comparing of the distilled expression to the reference set comprises calculating a dot product in vector space.

11. The method of claim 1, where the classifying of the biography comprises at least one of a heuristic and an algorithm derived from the reference set.

12. The method of claim 1, where the classifying of the biography comprises a naive-Bayes analysis.

13. The method of claim 1, further comprising adjusting the qualification score based on an external metric.

14. The method of claim 1, where the qualification score is normalized to be substantially independent of the qualification category.

15. The method of claim 14, where the qualification score is normalized to a percentile rank.

16. The method of claim 1, where the calculating of the connectivity score comprises assessing a link strength for each link in the referral path.

17. The method of claim 16, where the connectivity score partly depends on an average link strength over the referral path.

18. The method of claim 16, where the connectivity score partly depends on a weakest link strength within the referral path.

19. The method of claim 16, where the connectivity score partly depends on a qualification score of the intermediary calculated from a retrieved biography of the intermediary.

* * * * *